Jan. 21, 1947. L. B. MEYERSON Re 22,832

STERILIZER

Original Filed Nov. 11, 1931

INVENTOR.

Louis B. Meyerson

BY

Gray Overlin & Gray

ATTORNEYS.

Reissued Jan. 21, 1947

Re. 22,832

UNITED STATES PATENT OFFICE 22,832

STERILIZER

Louis B. Meyerson, deceased, late of Greenwich, Ohio, by Sanit-All Products Corporation, assignee, Greenwich, Ohio Original No. 1,951,099, dated March 13, 1934, Serial No. 574,349, November 11, 1931. Application for reissue August 1, 1946, Serial No. 687,560

3 Claims. (Cl. 21—85)

This invention relates to equipment for use in connection with the care of infants, and more particularly to a formula and sterilizer outfit, designed for the sterilization of all instruments ordinarily employed in the feeding of an infant and to serve as an aid in the preparation and handling of baby food formulas. To prepare the formula physicians recommend the use of special utensils, set apart for this purpose only. This outfit provides these utensils, compactly assembled in a portable container and so designed and arranged that the mother can sterilize, in the home or elsewhere, the milk and other ingredients for making of the formula as well as the various utensils. The arrangement also lends itself to the convenient packing of the utensils and of a supply of either empty or full sterile bottles for storage or transportation, and provides means for keeping filled bottles cold.

An object of this invention is to provide a sterilizer arranged and constructed particularly for use with the style of utensils commonly employed in the hygienic care of a child, and to combine with it so as to form a set including a number of such utensils, bottles and conveniently contained nipples, caps or stoppers designed to function as a compactly assembled combination. It is a further object of this invention to so construct the outfit that without change it will be particularly adapted to traveling, and have distinct advantages over the means at present employed for such purposes. When traveling this outfit is most useful, for a convenient size will hold a full twenty-four hours' supply of formula already prepared in bottles, with an abundant space for ice to keep the milk cold and fresh. It is a further purpose of this invention to provide a ready means for the pasteurization of milk, without the use of additional facilities than are afforded by my formula and sterilizer outfit; to similarly provide means for scalding and boiling; and also to afford the most convenient facilities for the preparation of formulas in food, as well as storing such until ready for use.

To the accomplishment of the foregoing and related ends, said invention, then, consists of the means hereinafter fully described and particularly pointed out in the claims, the annexed drawing and the following description setting forth in detail certain devices embodying the invention, such disclosed devices constituting, however, but one of various forms in which the principle of the invention may be used.

In said annexed drawing—

Figure 1:
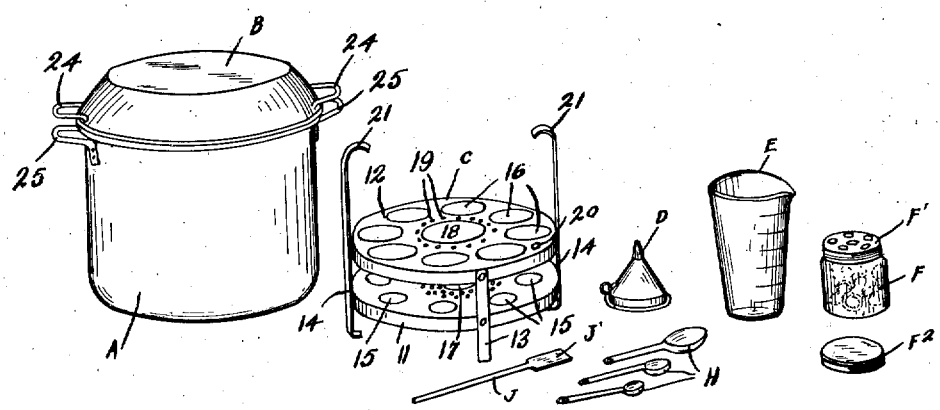
Figure 2:
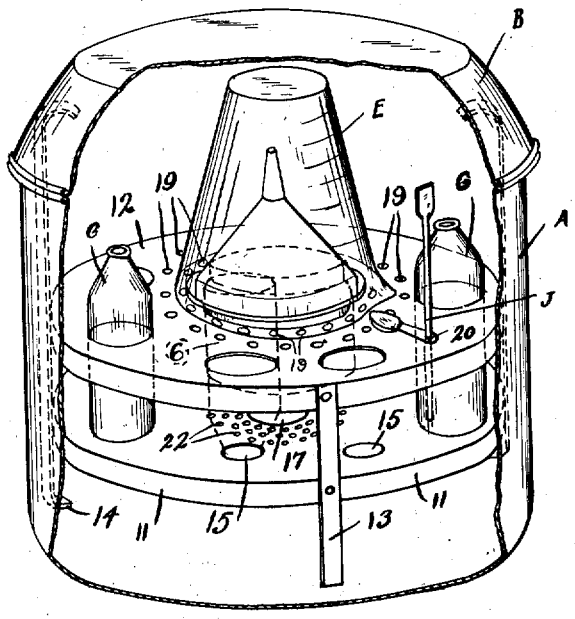

Figure 1 is a group view of the container, rack and parts disassembled; and Figure 2 is a perspective view of the container and cover of the sterilizer with sides broken away, having the rack or stand in place as when used, and containing therein certain utensils as bottles, beaker, and the like.

This invention consists of the combination of the pieces shown separately in Fig. 1, and shows assembled in the sterilizer in Fig. 2, in which A is the large receptacle which serves as a container for all the other utensils; B is the lid or cover of the container, which, when inverted, serves as a mixing bowl, A and B having suitable handles; C is the rack placed inside the container A, so constructed and arranged as to hold the various items in the manner best adapted to sterilization; D is a funnel; E, a beaker; F, a jar for containing nipples, caps or stoppers; F′, a jar lid for use in sterilizing; $F^2$, a jar lid for use at other times; G, ordinary nursing bottles; H, measuring spoons for use in the formula preparation; and J, a stirring rod for a paddle or blade J′ at one end; the above enumerated items being designed to be combined and arranged in the manner shown in Fig. 2; so as to form the complete formula and sterilizer outfit. The container A, lid B, and rack C may be made of suitable metal, such as aluminum.

The rack C is constructed of two parallel horizontal perforated plates 11 and 12 secured to and spaced apart a distance about two-thirds the heights of an ordinary bottle upon legs 13 and 14. The bottom plate 11 is perforated near the outer edge with a series of holes 15 of such size as to engage the bottom of a nursing bottle G without letting it pass through and in the upper plate 12 there is a corresponding series of larger holes 16 of a size for the bottle to pass into. Both plates are also perforated in the center, the central hole 17 in the lower plate being smaller than the central hole 18 in the upper plate, for the purpose of receiving the bottle F in either inverted or upright position as will be described later. The lower plate may also have a large number of smaller perforations 22 for the passage of steam and in the upper plate there may be a ring of smaller perforations 19 surrounding the central hole 18 to permit passage of steam to the inside of the inverted graduated beaker E when the outfit is assembled for sterilizing as shown in Fig. 2. Near the outer edge there is another small hole 20 in the upper plate only which is used in assembling the utensils as described below.

When all parts of the sterilizer are empty, the various elements can be assembled as shown in Fig. 2 for sterilizing, it being understood that a suitable amount of water is placed in the principal container A. The rubber nipples or stoppers are placed in the jar F and the perforated lid F′ put thereon, this jar then being placed upside down in the opening 18 with the cover F′ resting upon the rim of the opening 17 whereby steam can freely circulate to the inside of the jar. This latter feature of providing a separate container for sterilizing the nipples, instead of allowing them to be loosely thrown into the sterilizer, has the advantage that additional handling thereof, with the incident possibility of contamination, is eliminated. Funnel D is inverted over the upper end of the jar F and the beaker placed over the funnel. The ring of holes 19 permits free access of steam to the inside of the beaker and to the funnel. The nursing bottles G are placed upside down, as shown in dotted lines, and with nipples removed, in the openings 16 with their necks projecting down through the smaller holes 15. The rod J is passed through the holes in the handles of various spoons H and is then put through the hole 20, thus serving as a convenient means for keeping the spoons from being knocked around or falling into the water. The double rack being now loaded is lifted up by means of handles 21 formed on the upper extensions of the legs 14 and put into the lower part of the container A. The lid B being put in place and the container being on the stove, the sterilizing may be continued for as long as desired.

After the sterilizing is finished, the top B may be used as a mixing pan for the formula, using the beaker E and spoons H to measure out the ingredients and the rod J to stir the liquid. The nursing bottles G are now placed neck up in the rack and filled with the aid of the funnel D, the rack also serving to hold the bottles in a convenient position to place the sterilized stoppers or caps thereon. The nipples not being used until feeding hours are left in the jar F and may be kept sterile by putting on the solid lid $F^2$. If desired, a solution of boracic acid or other mild antiseptic may be kept in the jar.

Another use of the apparatus is for sterilizing either milk or the prepared formula liquid, which is done by putting the bottles neck up in the rack and inside the container, putting a plug of sterile absorbent cotton in the mouth of each and heating them for a suitable time. In case the apparatus is to be used for traveling, the filled bottles are kept neck up in the rack and the other utensils may either be placed in or left out according to whether they will be needed or not, and the outer container A filled with ice if the temperature warrants. The lid B can be held on by tying the handles 24 of the lid to the handles 25 of the lower container A.

From the foregoing it will be seen that there has been invented a combination sterilizing outfit which provides for practically every contingency in connection with feeding an infant whether at home or elsewhere either from the standpoint of sterilizing in the same container and at the same time, the bottles, utensils and nipples; preparing a formula, sterilizing or pasteurizing plain milk or carrying ready filled bottles. Each part is arranged to cooperate with the other parts in accomplishing this end, the whole being of strong and compact construction which may be assembled into a simple and readily handled package.

The outfit is designed and arranged so that the breakable elements are so far as possible of standard design and thus readily replaced.

Other modes of applying the principle of this invention may be employed instead of the one explained, change being made as regards the mechanism herein disclosed, provided the means stated by any of the following claims or the equivalent of such stated means be employed.

What is therefore particularly pointed out and distinctly claimed as this invention:

1. In a device of the character described, a container, a rack comprising upper and lower horizontal plates, separated a distance less than the height of a nursing bottle but sufficient to maintain such a bottle in vertical position, said plates being connected by legs extending well below the bottom plate whereby said bottom plate is supported sufficiently above the bottom of the container to hold the mouth of an inverted bottle clear of a shallow body of water in said container, the upper of said plates having a plurality of perforations each closely fitting a nursing bottle, the lower of said plates having a corresponding plurality of perforations of less diameter each below its respective upper perforation, said lower plate perforations being adapted to hold but not pass the neck of an inverted or the bottom of an upright nursing bottle, whereby bottles may be held snugly in said rack either inverted for sterilization by steam from water heated in said container or upright for other purposes including transportation.

2. In a sterilizing and packing device of the character described, an outer vessel, bottle holding elements therein comprising vertically spaced upper and lower members, co-operable bottle holding means mutually aligned in said members, those in the lower member being adapted to pass the neck but not the body of an inverted nursing bottle, the lower member being so spaced above the bottom of the outer vessel as to hold the mouth of such an inverted bottle well above the level of a shallow layer of water in the outer vessel, steam passages through said members, a central space on said upper member adapted to hold an inverted vessel, and perforations within said space adapted to allow access of steam through said member into such inverted vessel.

3. In a sterilizing and packing device of the character described, an outer vessel, vertically spaced bottle holding elements therein, co-operable bottle-engaging means in said holding elements, the bottle-engaging means in the upper of said elements fitting the body of a nursing bottle, the bottle-engaging means in the lower of said elements being of diameter greater than the neck but less than the shoulder of a nursing bottle, a support for the lower of said bottle-holding elements at a distance above the bottom of said outer vessel such that an inverted nursing bottle will be held with its mouth above a shallow body of water in said outer vessel.

SANIT-ALL PRODUCTS CORPORATION,
*Assignee of Louis B. Meyerson, Deceased,*
By JOSEPH KRONISH,
*President.*